Oct. 14, 1952　　　　H. A. BECKER　　　　2,613,654
HEATING OF FLUIDS
Filed June 30, 1950
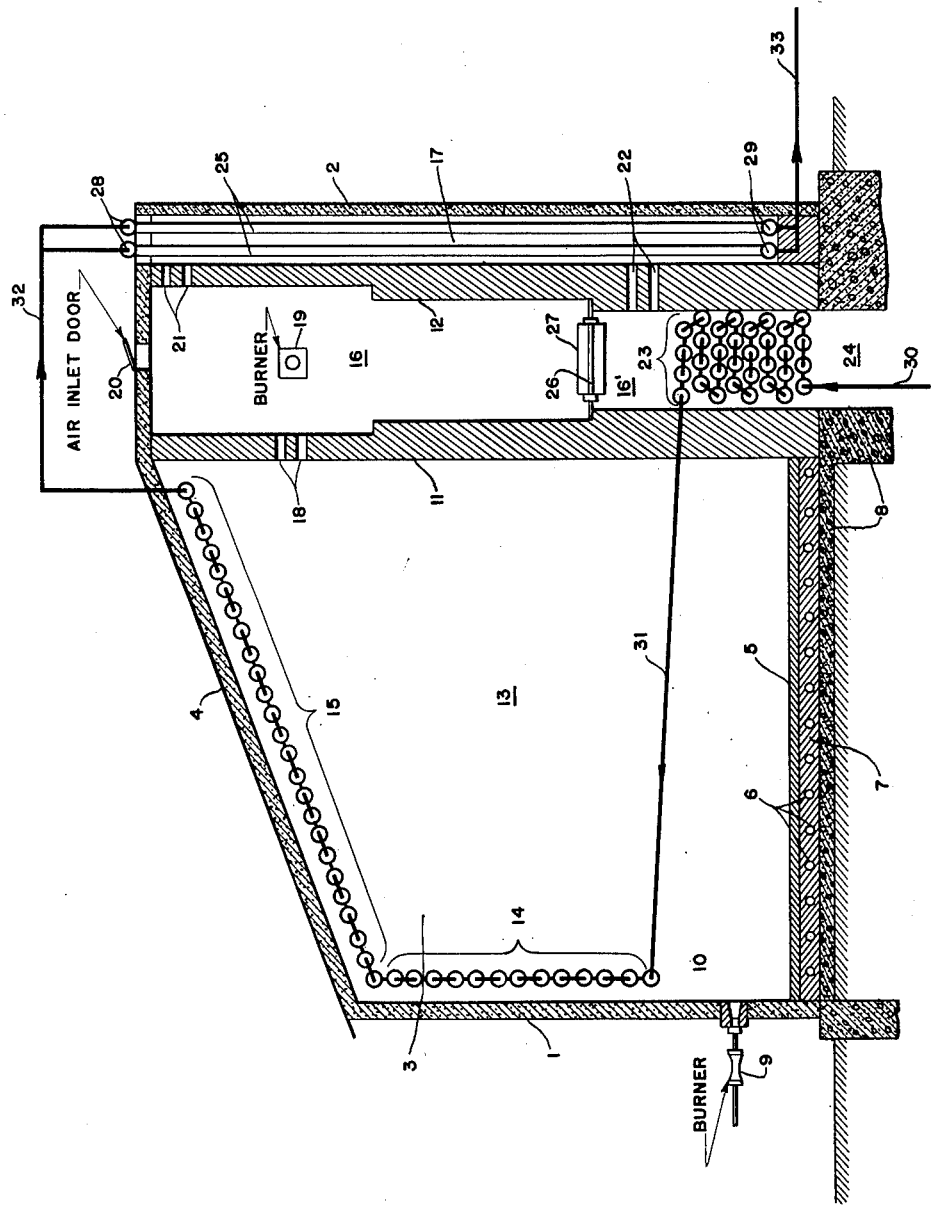
INVENTOR.
HAROLD A. BECKER
BY: Chester J. Giuliani
Philip T. Liggett
ATTORNEYS.

Patented Oct. 14, 1952

2,613,654

UNITED STATES PATENT OFFICE 2,613,654

HEATING OF FLUIDS

Harold A. Becker, La Grange, Ill., assignor to Universal Oil Products Company, Chicago, Ill., a corporation of Delaware Application June 30, 1950, Serial No. 171,518

4 Claims. (Cl. 122—240)

This invention relates to an improved heater of the radiant and convection type, suitable for effecting the controlled heating of fluid streams within a plurality of tubular fluid conduits therein. More specifically, the improvement is directed to a construction and arrangement providing a combined heater and reactor having means for effecting a uniform heating to all sides of a plurality of tubular members comprising at least a portion of the tubular fluid conduit contained within the heater.

Of the various types of heaters or reactors used in the chemical and petroleum processing industries, very few are constructed in a manner to provide uniform heating around each tubular conduit to in turn provide a uniform conversion of reactant streams passing through each individual conduit. For example, in conducting catalytic reactions with a fluid reactant stream passing through a tubular member containing catalyst, it may be particularly desirable, or necessary, to have the heat for an endothermic type of catalytic reaction supplied quite uniformly to the reaction zone, so that each tubular member of that zone is subjected to substantially the same heating conditions.

It is a principal object of the present invention to provide a heater with means for effecting a controlled production of hot combustion or flue gases, with radiant heating being effected in a combustion zone and controlled convection heating of tubular fluid conduits within two different convection heating sections.

It is a further object of the invention to provide a compact type of combined heater and reactor having a construction and arrangement which passes hot combustion gases uniformly around vertically disposed tubular conduits within a convectively heated reactor section.

It is still another object of the present invention to provide means for regulating the hot combustion gas flow through the convective heating sections of the unit and maintaining a controlled convection heating within at least one of the heating sections such that the flow of gas is axial with respect to the tubular fluid conduits therein.

In one embodiment the improved heater for fluid streams comprises in combination, a combustion and radiant heating section defined by a side wall, end walls, a partitioning wall, a roof and a floor, said section having a plurality of burner means extending along the lower portion of the side wall and a plurality of tubular fluid conduits disposed adjacent the side wall and the roof within the interior thereof, a smaller and elongated intermediate heating section defined by the end walls, the partitioning wall, and a second partitioning wall spaced away from and extending parallel to the latter, with gas passageways provided through the upper portion of the first mentioned partitioning wall and through both the upper and lower portions of the second mentioned partitioning wall, additional burners or heat supplying means within the upper portion of the smaller elongated heating section, a plurality of tubular fluid conduits extending in a longitudinal bank thereof within the lower portion of the elongated heating section, a relatively narrow vertically disposed convection heating section disposed between the second mentioned partitioning wall and a second side wall of the heater, with said narrow convection heating section communicating with the smaller intermediate heating section through the upper and lower positioned gas passageways within the second partitioning wall, whereby hot gases may pass from the upper portion of the elongated intermediate heating section and pass downwardly through the narrow convection heating section and from the latter into the lower portion of the intermediate section, and flue gas outlet means extending from the lower end of the latter section.

In a preferred embodiment of the improved heating unit, only a relatively few rows of tubes are disposed within the narrow convection heating section and the walls of the latter are spaced relatively close together and close to the tubes, such that the hot combustion gases that are directed downwardly through that zone pass uniformly over vertically disposed tubes in a flow which is axial with respect to the positioning of the tubes themselves. Also, a plurality of dampers are spaced horizontally throughout the length of the intermediately positioned heating section at a level above the tubes disposed in the lower portion thereof and above the gas passageways in the second mentioned partitioning wall, so that gases produced in or passing through the upper portion of the intermediate heating zone may be regulated as to their direction of flow. In other words, the quantity of hot gases passing through the upper portion of the intermediate heating section or to the narrow convection heating section, may be bypassed and directed primarily downwardly to a lower convection heating portion of the intermediate heating section, to in turn control the heating of the vertically disposed conduits in the narrow convection heating section.

It is also a feature of the present heater to incorporate air inlet doors in connection with the upper portion of the intermediate elongated and smaller heating zone, so that they may be opened when it is desired to cool the hot gases entering from the first mentioned combustion and radiant heating section. Alternatively, the additional burners in the end walls or roof of the smaller intermediate heating section may be utilized to add heat thereto, thus, either cooling or heating may be accomplished and a close temperature control of the gases maintained, which in turn effect the convection heating within the narrow heating zone having the vertically disposed tubes, as well as the convection heating within the lower portion of the intermediate heating zone, having a plurality of tubes placed in a horizontal bank.

The construction and arrangement of the combined heater-reactor unit, as well as further features and advantages in the heating and processing of fluid reactant streams, will be more apparent upon reference to the accompanying drawing and the following description thereof.

Referring now to the drawing, there is shown in a diagrammatic sectional-elevational view, the improved heater-reactor with vertically disposed refractory type of side walls 1 and 2, refractory end walls, one of which is shown and indicated as 3, a refractory roof 4, and a refractory floor 5. The outer walls and roof may be of any desired construction, such as of refractory tile or brick, or an insulating concrete mix attached to steel plates, or of any other conventional construction. The refractory floor 5 is indicated as being laid over an insulating concrete floor 7 having a plurality of cooling tubes 6 extending longitudinally therethrough. The entire heater is supported on a suitable reinforced foundation 8.

Heat is supplied to the unit by a plurality of burners 9 spaced horizontally along the lower portion of the side wall 1, with each burner receiving fuel and air in a manner to direct high temperature flame and gases horizontally into the interior of the heater above the floor 5. A plurality of burner blocks 10 with suitable openings are provided within the lower portion of the side wall 1 in order to accommodate the burners 9.

The interior of the heater has two spaced partitioning walls 11 and 12, such walls being of a suitable refractory tile or fire brick to withstand the temperature conditions of the particular heater. The heating zone defined between the side wall 1 and the partitioning wall 11 provides a large combustion and radiant heating zone 13 where the flame from burners 9 provides both radiant heating and hot combustion gases for subsequent convective heating. The heating zone 13 has a plurality of horizontally disposed tubes 14 spaced along the side wall 1 and a plurality of horizontally disposed tubes 15 adjacent the roof 4. These tubes are out of the direct line of flow of the hot combustion gases but are subjected to high temperature radiant heating from the hot flames passing into the heater above the floor 5, as well as from the heated partitioning wall 11. In an alternative construction, the burners may be directed upwardly along the wall 11 and high temperature radiant heat obtained for both the wall and roof tubes. A smaller elongated heating zone 16 between walls 11 and 12 provides both a combustion and convection heating zone, while the narrow vertical space between the partitioning wall 12 and the outer side wall 2 provides a convection heating section 17.

Hot combustion gases from the combustion and radiant heating zone 13 pass through slots or gas passageways 18 in the upper portion of partitioning wall 11, so that all of the hot combustion or flue gases enter the zone 16 for passage subsequently downwardly through its lower convection heating section 16', or through the narrow convection heating section 17.

The upper portion of the elongated heating section 16 is provided with burners 19 within each of the end walls, as indicated, or alternatively in the roof section, so that additional heat may be added to the hot combustion gases passing from the first heating zone 13, where such may be necessary. In addition, air inlet doors 20 are provided in the roof 4 above the heating zone 16, so that if the combustion gases entering that zone are of higher temperature than desired, cooling air streams may be introduced thereto, and the burners 19 are not used. A plurality of slots or gas passageways 21 are provided in the upper portion of the partitioning wall 12, while in addition slots and gas passageways 22 are provided within the lower portion of the partitioning wall 12, such that hot flue gases may pass downwardly through the convection heating section 17 and return to the lower convection heating section 16' to be subsequently discharged therefrom.

A bank of horizontally disposed tubes 23 is positioned within the lower heating section 16' in a manner to receive convection heating from hot gases passing either directly downwardly through the heating section 16 or from the narrow convection heating section 17 by way of gas passageways 22. The flue gases passing around the tube bank 23 are discharged by way of a suitable flue 24, which is built within the foundation 8 and connects to a suitable stack, not shown.

In accordance with the present invention, the narrow convection heating section 17 is provided with a plurality of vertically disposed tubular members 25 so that the combustion gases passing downwardly through the convection heating zone 17 flow in a direction corresponding with the axis of the elongated tubular members to provide uniform heating to each tubular member 25, with a substantially uniform temperature gradient existing from top to bottom of the heating section 17. The partitioning wall 12 and the outer wall 2 are preferably placed relatively close together so that a confined flow of the hot gases takes place around each of the tubular members 25, and uniform heating is accomplished around each tube 25. A plurality of baffles 26 and adjustable dampers 27 extend longitudinally and horizontally between the partitioning walls 11 and 12 in a manner permitting the control of both the convection heating section 17 and the lower convection heating section 16'. Where a large quantity of heat is desired within the outer narrow convection heating section 17, the dampers 27 are adjusted to reduce flow therethrough, passing the major portion of the flue gases outwardly and downwardly through the convection heating section 17, around tubes 25. Conversely, when it is desired to reduce the heating load to tubes 25 and bypass them, the adjustable dampers 27 are opened to pass the majority of the flue gases directly downward through the lower convection heating section 16', across tube bank 23, and outwardly through the underground flue 24.

Various arrangements of tubes may be utilized with the heating unit, the positioning of the tubular members in the present drawing being merely diagrammatic and not limiting. In other words, more than two rows of tubes 25 may be utilized within the narrow convection heating section 17, however, preferably only a few rows of tubes are to be utilized in this section in order to maintain the desired uniform heating of all tubular members within that zone. Also, more than one row of tubes may be utilized along the side wall 1 and the roof 4, where the present tube banks 14 and 15 are indicated, or in some cases it may not be necessary to have any roof tubes 15. Where multiple rows of tubes are used in the heater, the tubes within the alternate rows are preferably staggered so that one row of tubes does not shield another and better heating thus prevails.

It is also a feature of the present heater embodiment to provide a combined heater and reactor, with the vertically disposed tubes 25 being filled with a suitable catalytic material which aids in effecting a desired conversion of a fluid reactant stream under controlled heating conditions. When catalyst is used in the members 25 of convection heating section 17, then preferably headers 28 are used above each of the rows of tubes 25 to provide distribution of a reactant stream in a uniform parallel flow downwardly through each member, and likewise horizontal collecting headers 29 are provided below the rows of tubes 25 at the bottom of heating section 17. Means may be provided in either the upper or lower headers to introduce and remove catalyst from the vertical reactor tubes 25.

The present drawing indicates diagrammatically one fluid heating flow which may be used in connection with the improved heater and reactor, such as, for example, where it is desired to heat and convert a light hydrocarbon stream to additional high octane gasoline fractions in a catalytic reforming process. A charge stream is introduced through an inlet line 30 to the lower row of the tube bank 23, to pass serially through the horizontally disposed tubes of that bank by means of suitable return fittings or U-bends at the end of each tube. Thus, the material passes in indirect heat exchange with and countercurrently to hot flue gases passing downwardly through the lower heating zone 16'. A resulting preheated stream passes from the upper row of the tube bank 23, by way of the cross-over or connecting line 31, to the lower tube of the row or bank 14 which is adjacent the side wall 1. Similarly, the reactant stream passes in a series flow upwardly through the row of tubes 14 by means of suitable U-bends or return fittings to the top of the bank 14 and through the plurality of tubes 15 disposed adjacent the roof 4. The reactant stream is subjected to high temperature radiant heating within the zone 13, so that the resulting high temperature stream leaving the last tube of the bank or row of tubes 15 is brought to a desired high reaction temperature suitable for the initial contact with the solid catalytic material maintained in the vertically disposed tube 25. A suitable connecting line or cross over line 32 connects with distributing headers 28, in a manner permitting a substantially uniform parallel flow of the reactant fluid to each of the vertically disposed conduits 25, which in turn are provided with a packing of solid catalyst suitable to aid the conversion of the hydrocarbon stream to the desired products.

In a catalytic reforming process, it is particularly desirable to maintain a closely controlled temperature gradient throughout the length of the tubes, and satisfy high heat requirements for the upper ends of the catalyst containing tubes. In other words, the reaction for reforming the hydrocarbon stream to lower boiling and high octane products is highly endothermic, and the inlet end of the tube thus requires a greater supply of heat to that portion than is necessary in the intermediate or lower portions of the packed tubes. At the lower ends of the tubes 25, the resulting product stream is collected in the headers 29 and discharged by way of an outlet line 33, to pass to suitable recovery equipment.

It may be noted that the present construction and arrangement is particularly adapted to this type of operation, for the hot gaseous stream enters the upper portion of the convection heating section 17 by way of the gas passageways 21 to thus flow downwardly concurrently with the reactant stream flow through the reactor conduit 25. However, in addition it should be pointed out that other flows or methods of connecting the various groups of tubes may be employed to conduct other types of processing. For example, it may be desirable in some instances to have a countercurrent flow through the vertical tubular conduits 25, with the lower conduits 29 serving as flow distributing headers, and the upper conduits 28 as collecting headers. Any one or more of the tube banks indicated in the heater may be utilized independently to handle the heating of a different reaction stream, without passing to the other banks. Alternatively, the tubular members of bank 23 and rows 25 may be used for preheating a fluid stream, while the tubular conduits of groups 14 and 15 are utilized for a final high temperature heating of the reactant stream. In still another instance, a parallel flow may be utilized through the tubular banks, with suitably connected headers, return bends and crossovers, providing the desired parallel flow through the heater.

I claim as my invention:

1. A heater for fluids, comprising, a combustion and radiant heating section defined by a side wall, end walls, a partitioning wall, a roof and a floor, burner means for said radiant heating section, a plurality of tubular fluid conduits disposed in said radiant heating section, a smaller elongated intermediate heating section defined by said end walls, said partitioning wall and a second partitioning wall extending parallel to the latter, a bank of tubular fluid conduits extending longitudinally within the lower portion of said intermediate heating section, additional burner means connecting with the upper portion of the last said heating section, gas passageways extending through the upper portion of first said partitioning wall, flue gas outlet means extending from the lower portion of said intermediate heating section below said bank of tubes, whereby the latter receive convection heating from flue gases passing therethrough, a narrow vertically disposed convection heating section defined by the second mentioned partitioning wall and a second side wall of said heater, gas passageways through both the upper and lower portions of said second mentioned partitioning wall above said bank of conduits and said flue gas outlet means, providing thereby flue gas circulation from said intermediate section through said narrow convection heating zone and back to the intermediate section, and a plurality of vertical fluid conduits extending from the upper portion to the lower portion of said narrow convection heating section.

2. The heater of claim 1, further characterized in that a plurality of adjustable dampers extend between the two partitioning walls in said intermediate heating section and above said bank of tubular fluid conduits extending longitudinally in the lower portion thereof, whereby flue gases may be regulated to control the quantity of gas passing directly downwardly through said intermediate heating section and through said narrow convection heating section.

3. A heater for fluids, comprising, a combustion and radiant heating section defined by a side wall, end walls, a partitioning wall, a roof and a floor, burner means extending longitudinally along the lower portion of said side wall and directed toward said partitioning wall, a plurality of tubular fluid conduits disposed adjacent said side wall and said roof, in a manner to receive radiant heating, a smaller elongated intermediate heating section defined by said end walls, said partitioning wall and a second partitioning wall spaced away from and extending parallel with the first mentioned partitioning wall, gas passageways through the upper portion of first said partitioning wall, additional burner means connecting with the upper portion of said elongated intermediate heating section, a plurality of tubular fluid conduits extending in a bank thereof longitudinally within the lower portion of said elongated intermediate heating section, gas passageways through the upper and lower portions of said second partitioning wall above said bank of conduits in the intermediate heating section, a narrow vertically disposed convection heating section between said second mentioned partitioning wall and a second side wall of said heater, said narrow convection heating section communicating with said intermediate heating section through said gas passageways in the upper and lower portions of second said partitioning wall, a plurality of vertical tubular fluid conduits extending from the upper portion to the lower portion of said narrow heating section, with fluid headers above and below said vertically disposed tubular conduits and connecting therewith, a plurality of adjustable dampers extending longitudinally and horizontally between said partitioning walls throughout the length of said elongated intermediate heating section, said dampers at a level above said bank of tubes in the lower portion of said intermediate heating section and above said gas passageways in the lower portion of said second partitioning wall, said dampers providing thereby control means for the flue gas flow downwardly through said elongated intermediate heating section and through said narrow vertically disposed convection heating section, and adjustable air inlet means in said heater roof above said intermediate heating section providing additional temperature control for said hot flue gas stream.

4. The heater of claim 3, further characterized in that the plurality of tubes adjacent said side wall and said roof within said combustion and radiant heating section are horizontally disposed tubes arranged in a single row thereof adjacent said side wall and said roof and are serially connected, said horizontally disposed bank of tubes in the lower portion of said intermediate heating section are serially connected, with fluid flow passing upwardly, from the lower row of the bank of tubes to the upper row of the bank of tubes and from the latter to the lower tube of said horizontal tubes adjacent said side wall, and fluid flow through the serially connected side and roof wall tubes passes from the upper roof tube to said headers above said vertically positioned tubes within said narrow convection heating section, whereby said headers may distribute the fluid flow in a parallel manner through all of said vertically disposed fluid conduits to said headers therebelow.

HAROLD A. BECKER.

REFERENCES CITED

The following references are of record in the file of this patent:

UNITED STATES PATENTS

| Number | Name | Date |
| --- | --- | --- |
| 2,009,092 | Mekler | July 23, 1935 |
| 2,048,351 | Melberg | July 21, 1936 |
| 2,209,341 | Lobo | July 30, 1940 |
| 2,285,037 | Lobo | June 2, 1942 |